(12) United States Patent
Cha et al.

(10) Patent No.: US 12,673,729 B1
(45) Date of Patent: Jul. 7, 2026

(54) BODY FOR VEHICLE

(71) Applicants: Hyundai Motor Company, Seoul (KR); Kia Corporation, Seoul (KR)

(72) Inventors: Hyo Seop Cha, Hwaseong-si (KR); Seung Min Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/243,314

(22) Filed: Jun. 19, 2025

(30) Foreign Application Priority Data

Apr. 2, 2025 (KR) ........................ 10-2025-0043096

(51) Int. Cl.
B62D 21/15 (2006.01)
(52) U.S. Cl.
CPC .................................. B62D 21/155 (2013.01)
(58) Field of Classification Search
CPC .... B62D 21/11; B62D 21/152; B62D 21/155; B62D 33/023; B62D 33/027
See application file for complete search history.

(56) References Cited

U.S. PATENT DOCUMENTS

| 6,808,229 | B2 * | 10/2004 | Yamaguchi | B62D 25/08 296/203.02 |
| 7,008,007 | B2 * | 3/2006 | Makita | B60R 19/34 296/203.02 |
| 7,461,850 | B2 * | 12/2008 | Kurth | B62D 21/155 280/124.109 |
| 7,594,559 | B2 * | 9/2009 | Kitoh | B62D 21/155 180/274 |
| 7,717,465 | B2 * | 5/2010 | Hedderly | B62D 25/082 180/311 |
| 7,810,876 | B2 * | 10/2010 | Hedderly | B62D 25/08 296/29 |
| 7,815,245 | B2 * | 10/2010 | Hiraishi | B62D 25/082 296/203.02 |
| 7,900,964 | B2 * | 3/2011 | Chretien | B62D 21/155 180/274 |
| 8,333,425 | B2 * | 12/2012 | Yoshida | B62D 21/155 296/187.09 |
| 8,414,082 | B2 * | 4/2013 | Nakamura | B62D 33/037 296/190.04 |
| 8,439,141 | B2 * | 5/2013 | Bessho | F16H 57/0416 180/339 |
| 8,550,543 | B2 * | 10/2013 | Yoshida | B62D 21/155 296/187.1 |
| 9,150,251 | B2 * | 10/2015 | Ghislieri | B62D 25/082 |
| 9,539,967 | B2 * | 1/2017 | Mori | B60R 19/34 |
| 9,643,653 | B2 * | 5/2017 | Groen | B62D 21/152 |
| 9,663,050 | B2 * | 5/2017 | Nishida | F16F 7/12 |
| 9,676,417 | B2 * | 6/2017 | Yamada | B62D 21/152 |
| 9,809,254 | B2 * | 11/2017 | De Leo | B62D 27/02 |
| 9,914,484 | B2 * | 3/2018 | Kawabe | B62D 21/152 |
| 10,086,881 | B2 * | 10/2018 | Kim | B62D 25/08 |
| 10,207,555 | B2 * | 2/2019 | Mailhot | B60R 21/13 |
| 10,336,369 | B2 * | 7/2019 | Viaux | B62D 21/02 |

(Continued)

*Primary Examiner* — Laura Freedman
(74) *Attorney, Agent, or Firm* — Slater Matsil, LLP

(57) ABSTRACT

A body for a vehicle can include a subframe mounting member disposed vertically and having a lower end mounted on an end of a subframe, and a front side member mounted on the rear of the subframe mounting member, which can be part of forming a quadrilateral frame and/or a triangular frame structure.

20 Claims, 7 Drawing Sheets

(56)                    References Cited

U.S. PATENT DOCUMENTS

| 10,435,076 | B2 * | 10/2019 | Huang | B62D 21/02 |
|---|---|---|---|---|
| 10,464,609 | B2 * | 11/2019 | Ahmed | B60K 17/00 |
| 10,494,028 | B2 * | 12/2019 | Madasamy | B60R 19/24 |
| 10,717,469 | B2 * | 7/2020 | Matsuoka | B62D 25/20 |
| 11,014,419 | B2 * | 5/2021 | Danielson | B60T 7/04 |
| 11,027,779 | B2 * | 6/2021 | Takakuwa | B62D 21/11 |
| 11,318,995 | B2 * | 5/2022 | Charbonneau | B62D 21/03 |
| 11,345,404 | B2 * | 5/2022 | Tashiro | B62D 21/152 |
| 11,577,785 | B2 * | 2/2023 | Kim | B62D 27/06 |
| 12,233,938 | B2 * | 2/2025 | Nagasawa | B60R 19/24 |
| 12,263,886 | B2 * | 4/2025 | Nagasawa | B60K 1/00 |
| 2015/0251613 | A1 * | 9/2015 | Mori | B62D 21/152 |
| | | | | 293/133 |
| 2024/0278843 | A1 * | 8/2024 | Nagasawa | B62D 21/155 |
| 2024/0278847 | A1 * | 8/2024 | Nagasawa | B62D 25/082 |
| 2024/0286681 | A1 * | 8/2024 | Abiko | B62D 21/03 |
| 2025/0026406 | A1 * | 1/2025 | Nagasawa | B60K 11/04 |
| 2025/0026408 | A1 * | 1/2025 | Nagasawa | B62D 21/11 |

* cited by examiner

BODY FOR VEHICLE

CROSS-REFERENCE TO RELATED APPLICATIONS

The present application claims priority of Korean Patent Application No. 10-2025-0043096 filed on Apr. 2, 2025, the entire contents of which is incorporated herein for all purposes by this reference.

TECHNICAL FIELD

The present disclosure relates to a body for a vehicle.

BACKGROUND

For front mounting of a front subframe, the front subframe is mounted at the front of a side member.

When the side member is directly connected to the front mounting position of the front subframe, vehicle body stiffness is enhanced. However, if there is a height difference between the front mounting position of the front subframe and the side member, vehicle body stiffness is reduced.

Therefore, to enhance vehicle body stiffness, the height difference may be overcome by connecting a separate body bracket between the front mounting position of the front subframe and the side member.

However, if the height difference between the front mounting position of the front subframe and the side member is large, a longer body bracket may be required, which may reduce stiffness of the subframe in a T-direction.

The matters described above in this background section are provided solely to facilitate a better understanding of the background of the disclosed embodiments of the present disclosure and should not be construed as an admission that they constitute a related art already publicly known, available, or in use.

SUMMARY

Embodiments of the present disclosure relate to a body for a vehicle, which can satisfy crash stiffness of a body and stiffness of a subframe even when there is a large step difference between a mounting position of the subframe and a mounting position of a side member.

Embodiments disclosed herein can provide a body for a vehicle, which can satisfy crash stiffness of a body and stiffness of a subframe even when there is a large height difference between a mounting position of the subframe and a mounting position of a side member.

Technical advantages of the disclosed embodiments are not necessarily limited to the technical advantages mentioned above, and other technical advantages not mentioned above can be understood by those skilled in the art to which the disclosed embodiments pertain from the following description.

A body for a vehicle according to an embodiment of the present disclosure may include: a subframe mounting member disposed vertically and having a lower end mounted on an end of a subframe; and a front side member mounted on a rear of the subframe mounting member.

A front cross member and a front upper side member may be mounted, in different directions relative to each other, on the subframe mounting member.

The subframe mounting member, the front cross member, and the front upper side member may be mounted in directions perpendicular to one another.

The front cross member may be mounted laterally at the front of the subframe mounting member, and the front upper side member may be mounted longitudinally at the rear of the subframe mounting member.

The front cross member and the front upper side member may be mounted on the subframe mounting member at a height at which the front cross member and the front upper side member face each other.

A plurality of other members may be connected to the subframe mounting member and the front side member to form a rectangular frame.

The front upper side member and a dash side member may be connected to the subframe mounting member and the front side member to form a rectangular frame.

The front upper side member may be mounted longitudinally on an upper portion of the subframe mounting member; the front side member may be mounted longitudinally on the subframe mounting member below the front upper side member; and a dash side member may be mounted vertically between the front side member and the front upper side member to form a rectangular frame.

Front and rear portions of the subframe may be mounted on lower ends of the members configured to form the rectangular frame.

The front portion of the subframe may be mounted on the lower end of the subframe mounting member; the rear portion of the subframe may be mounted on a lower end of the front side member.

The subframe mounting member may be connected to a member configured to form a frame of a tailgate opening.

A front cross member configured to form a lower end of a frame of a tailgate opening may be mounted laterally on the subframe mounting member; and side outer members configured to form left and right ends of the frame of the tailgate opening may be mounted vertically on the front cross member.

Side outer completes extending from the tailgate opening to sides of the vehicle may be mounted laterally on the side outer members.

A side member extension may be mounted on an inner surface of the subframe mounting member, such that the side member extension serves as an extension of the front side member.

The side member extension may be formed with a cross-sectional shape that matches the front side member.

A beam plate may be coupled to cover a front surface of the subframe mounting member to form a closed cross-sectional structure; a forming portion may be formed to protrude from an inner surface of the beam plate configured to face the subframe mounting member; and the side member extension may be formed to surround a periphery of the forming portion and connected to the inner surface of the beam plate.

A beam plate may be coupled to cover a front surface of the subframe mounting member; and the beam plate may be mounted, together with the subframe mounting member, on the front cross member.

A mounting bracket may be coupled to a lower end of the subframe mounting member and mounted on the subframe; and a mounting reinforcement may be secured to an inner surface, adjacent to the mounting bracket, of the subframe mounting member and be mounted, together with the mounting bracket, on the subframe.

According to an embodiment of the present disclosure, the subframe mounting member can be mounted, in a perpendicular direction, on the front portion of the subframe, and the front side member can be mounted on the subframe mounting member. Accordingly, a load of the subframe can be distributed, along the subframe mounting member, toward the front side member.

Accordingly, in an embodiment of the present disclosure, by reinforcing the mounting stiffness of the subframe, crash stiffness of the body and stiffness of the subframe can be satisfied even when there is a large difference in height between a mounting position of the subframe and a mounting position of the side members.

The advantages that may be achieved by the disclosed embodiments are not necessarily limited to the advantages mentioned above, and other advantages not mentioned above can be appreciated from the following description by those skilled in the art to which the disclosed embodiments pertain.

DETAILED DESCRIPTION OF ILLUSTRATIVE EMBODIMENTS

Figure 1:
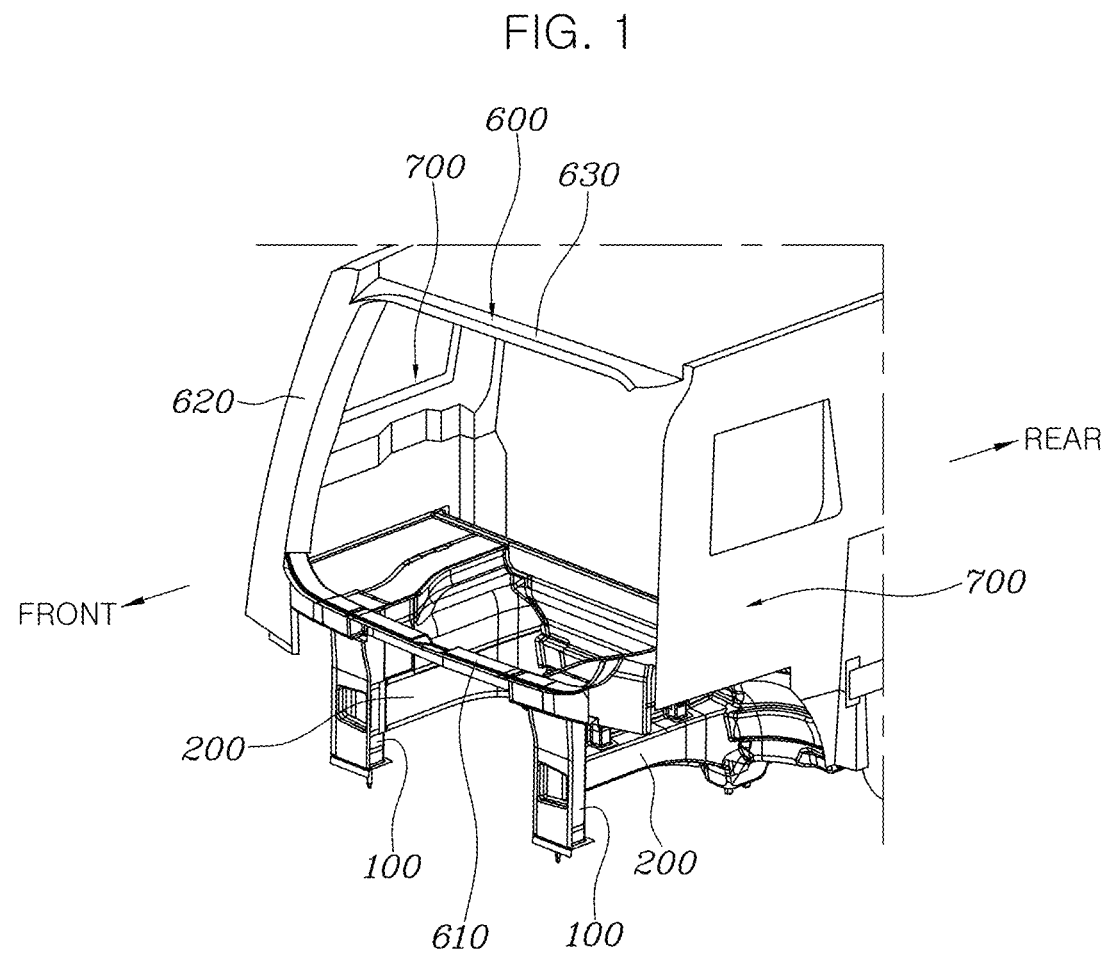
FIG. 1 is a perspective view illustrating a tailgate opening configured in a body of a vehicle according to an embodiment of the present disclosure.

In describing example embodiments disclosed herein, when a detailed description of a known related art may obscure the gist of the embodiments disclosed herein, the detailed description thereof can be omitted herein. The accompanying drawings are merely for easy understanding of the example embodiments disclosed herein, and the technical spirit disclosed herein is not necessarily limited by the accompanying drawings. The present disclosure can be understood to include modifications, equivalents, and substitutes included in the spirit and technical scopes of the present disclosure. The following disclosure is not intended to necessarily limit the present disclosure to the described form or a specific field. It can be considered that various alternative variations of the present disclosure can be possible, whether explicitly stated or implied herein. Those skilled in the art to which the present disclosure pertains can recognize that the form and details of example embodiments of the present disclosure may be modified.

The present disclosure is described with reference to specific example embodiments. However, as understood by those skilled in the art to which the present disclosure pertains, the various embodiments disclosed herein may be modified or otherwise implemented in various different ways without departing from the spirit and scopes of the present disclosure. Accordingly, the embodiments of the following description should be considered examples and are intended to instruct those skilled in the art to which the present disclosure pertains on how to develop and use various embodiments. It can be understood that the forms of example embodiments of the present disclosure illustrated and described herein are to be taken as representative example embodiments. Equivalent elements, materials, processes, or steps, may be substituted with those exemplified and described in the present disclosure. As used in the present disclosure, expressions such as "including," "comprising," "incorporating," "consisting of," "have," "is," and the like, can be construed in a non-exclusive manner, i.e., to permitting the indication of items, components, or elements not explicitly stated. References to the singular can be construed to include the plural.

The various example embodiments disclosed herein can be taken in an example and illustrative sense and should not be construed as necessarily limiting the scopes of the present disclosure. References to joining (e.g., attached, affixed, coupled, connected, etc.) can be used to facilitate better understanding of example embodiments of the present disclosure and are not intended to necessarily limit the location, direction, or use of the components or the method disclosed herein. Accordingly, when references to joining are present, they can be construed broadly. Furthermore, such references to joining do not necessarily imply that two or more elements are directly connected to each other. Numerical terms, such as "first," "second," "third," "primary," "secondary," "major," or any other generic or numerical terms, can be taken as identifiers solely to facilitate better understanding of the various components, forms, variations, or modifications of the present disclosure and do not necessarily imply any limitations to any component, form, variation, or modification or to any order or preference thereof. That is, these expressions may be used to describe various components, but the components are not necessarily limited by such expressions. Such expressions can be used solely for the purpose of distinguishing one component from another component.

When a component is referred to as being "connected" or "coupled" to another component, the component may be directly connected or coupled to another component, but it can be understood that still another component may be present between the component and another component. Conversely, when a component is referred to as being "directly connected" or "directly coupled" to another, it can be understood that still another component may not be present between the component and another component.

Any number of components or a variety of components in any of the configurations described herein may be included in an embodiment the disclosure described herein or other embodiments. The components may include any combination of the features described herein, and may be arranged in any of the various configurations described herein. The concepts associated with the structure and arrangement of components, as well as their use and operation, of the present disclosure may be applied not only to certain example embodiments discussed herein but also to any number and combination of embodiments. Example embodiments including those having various features of various arrangements are described below with reference to the drawings.

Hereinafter, example embodiments disclosed herein will be described in detail with reference to the drawings. Same reference numerals can be given to the same or similar components regardless of reference numerals, and a repetitive description thereof can be omitted.

A body for a vehicle according to an embodiment of the present disclosure can be configured to include: a subframe mounting member 100 disposed vertically and having a lower end mounted on an end of a subframe 500; and a front side member 200 mounted on a rear of the subframe mounting member 100.

Referring to FIGS. 1 to 4, the front side members 200 are provided on left and right sides of a vehicle, and the subframe mounting members 100 are disposed at the front of the front side member 200.

The front side member 200 can be disposed lengthwise in a longitudinal direction of the vehicle.

In particular, the subframe mounting member 100 can be disposed lengthwise in a vertical direction, such that a central portion of a rear surface of the subframe mounting member 100 is mounted on a front end of the front side member 200.

A lower end of the subframe mounting member 100 can be mounted on a front portion 510 of the subframe 500.

That is, the subframe mounting member 100 can be mounted, in a perpendicular direction, on the front portion 510 of the subframe 500; and the front side member 200 can be mounted on the subframe mounting member 100. Accordingly, a load of the subframe 500 can be distributed, along the subframe mounting member 100, toward the front side member 200.

Accordingly, by reinforcing mounting stiffness of the subframe 500, crash stiffness of the body and stiffness of the subframe 500 can be satisfied even when there is a large difference in height between a mounting position of the subframe 500 and a mounting position of the front side member 200.

Furthermore, in the disclosed embodiments, a front cross member 610 and a front upper side member 300 may be mounted, in different directions to each other, on the subframe mounting member 100.

That is, the subframe mounting member 100 can be not only connected to the front cross member 610, but also connected to the front upper side member 300. Accordingly, three members can be connected, and in particular, the three members can be connected in different lengthwise directions.

Accordingly, the load of the subframe 500 can be distributed, along the subframe mounting member 100, not only toward the front side member 200 but also toward the front cross member 610 and the front upper side member 300, thereby further reinforcing the stiffness of the body.

In particular, the subframe mounting member 100, the front cross member 610, and the front upper side member 300 can be configured to be mounted in directions perpendicular (or generally perpendicular) to one another.

In an example embodiment of the present disclosure, the front cross member 610 may be mounted laterally (e.g., side-to-side) at a front of the subframe mounting member 100, and the front upper side member 300 may be mounted longitudinally (e.g., forward-to-rearward) at the rear of the subframe mounting member 100.

Figure 3:
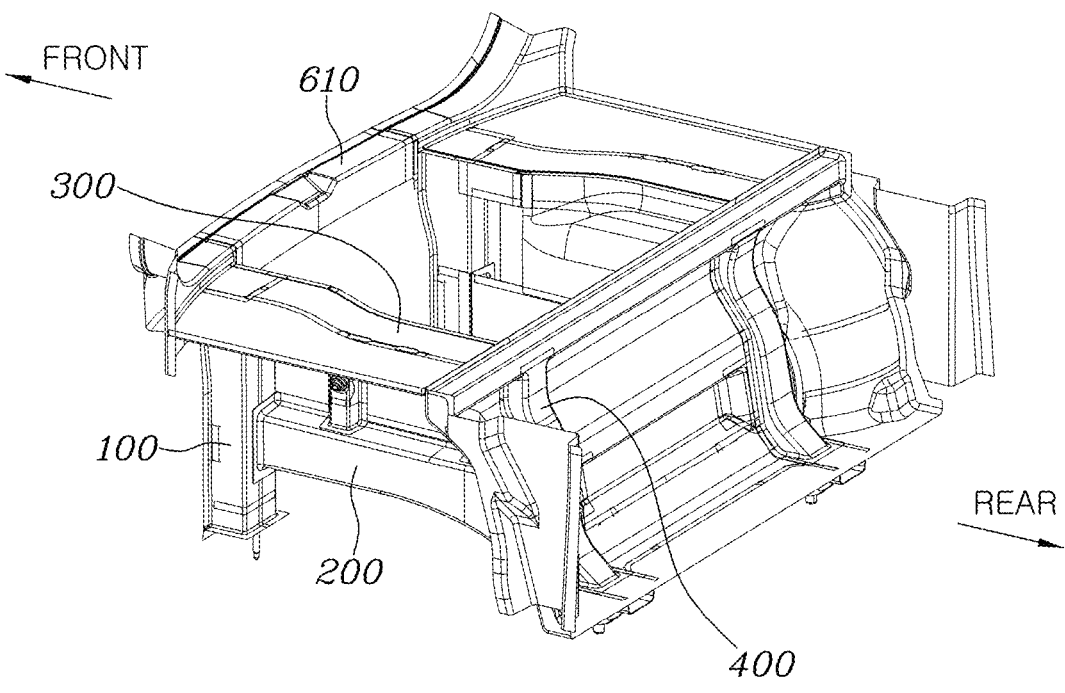
FIG. 3 is a perspective view illustrating members directly connected to a subframe mounting member according to an embodiment of the present disclosure.

Referring to FIG. 3, the front cross member 610 can disposed lengthwise in a lateral direction, and an upper front surface of the subframe mounting member 100 can be mounted on a rear surface of the front cross member 610.

The front upper side member 300 can be disposed lengthwise in the longitudinal direction, and a front surface of the front upper side member 300 can be mounted on an upper rear surface of the subframe mounting member 100.

That is, the subframe mounting member 100 and the front cross member 610 can be mounted in directions perpendicular (or generally perpendicular) to each other; the subframe mounting member 100 and the front upper side member 300 can be mounted in directions perpendicular (or generally perpendicular) to each other; and the front cross member 610 and the front upper side member 300 can be also mounted in directions perpendicular (or generally perpendicular) to each other.

Accordingly, the load applied along the subframe mounting member 100 can be distributed through the front cross member 610 and the front upper side member 300 mounted in directions perpendicular (or generally perpendicular) to the subframe mounting member 100, thereby reinforcing the stiffness of the body.

Furthermore, the front cross member 610 and the front upper side member 300 can be configured to be mounted on the subframe mounting member 100 at a height at which the front cross member 610 and the front upper side member 300 face each other (e.g., or are at a same or similar height that are different than that of the subframe 500).

That is, the front cross member 610 can be mounted on the upper front surface of the subframe mounting member 100, and the front upper side member 300 can be mounted on the upper rear surface of the subframe mounting member 100 at the same height as the front cross member 610.

Accordingly, the load applied along the subframe mounting member 100 may be uniformly distributed to the front cross member 610 and the front upper side member 300 mounted on an upper end of the subframe mounting member 100.

In an embodiment of the present disclosure, a plurality of other members may be connected to the subframe mounting member 100 and the front side member 200 to form a generally rectangular frame or quadrilateral frame (e.g., a rectangular frame, a trapezoidal frame, or an irregular quadrilateral frame), for example.

In an embodiment of the present disclosure, the front upper side member 300 and a dash side member 400 may be configured to be connected to the subframe mounting member 100 and the front side member 200 to form a quadrilateral frame.

Figure 4:
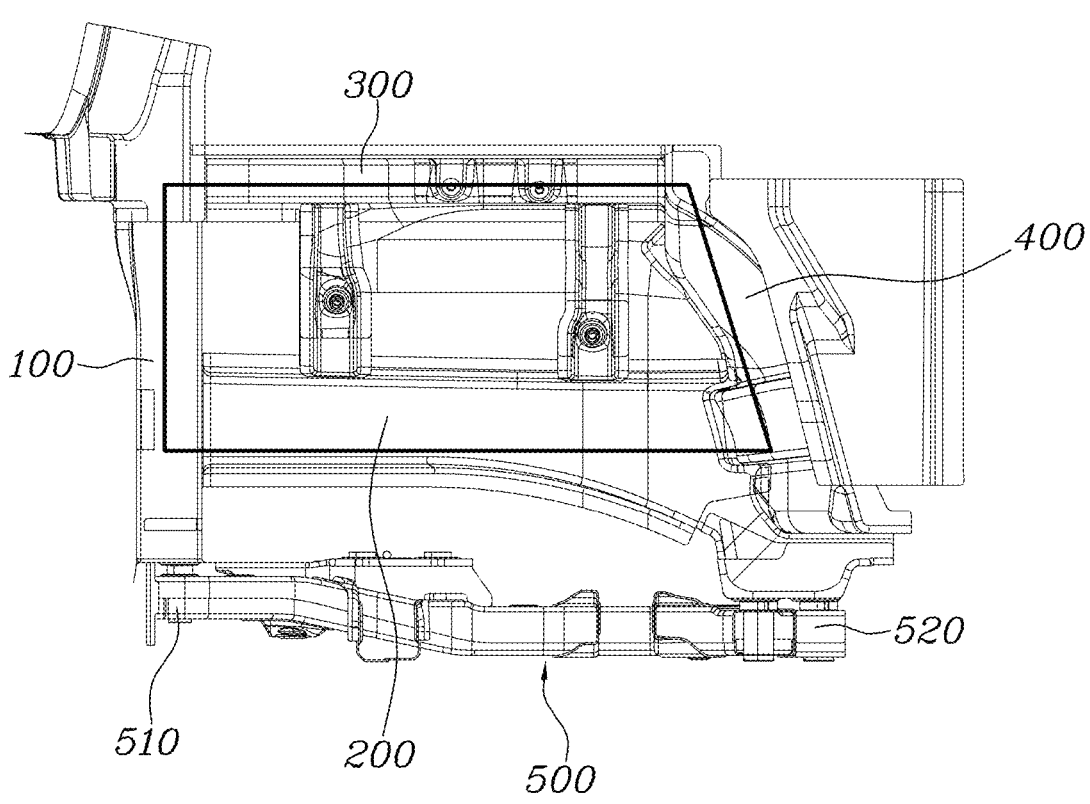
FIG. 4 is a side view illustrating a configuration in which the subframe mounting member forms, with other members, a trapezoidal body frame according to an embodiment of the present disclosure.

Referring to FIGS. 3 and 4, the front side member 200, the front upper side member 300, and the dash side member 400 are connected to the subframe mounting member 100 to form a quadrilateral frame on a side of the vehicle, thereby forming a large frame structure on the side of the body. Accordingly, the load of the subframe 500 can be distributed among the members forming the quadrilateral frame, thereby reinforcing the stiffness of the body.

In an embodiment of the present disclosure, for forming the quadrilateral frame as described above, the front upper side member 300 may be mounted longitudinally on an upper portion of the subframe mounting member 100; the front side member 200 may be mounted longitudinally on the subframe mounting member 100 below the front upper side member 300; and the dash side member 400 may be mounted vertically between the front side member 200 and the front upper side member 300 to form the quadrilateral frame.

Referring to FIGS. 3 and 4, the subframe mounting member 100 can be disposed lengthwise in the vertical direction, and a front end of the front upper side member 300 can be mounted on the upper rear surface of the subframe mounting member 100 and can be disposed lengthwise in the longitudinal direction.

The front side member 200 can be disposed lengthwise in the longitudinal direction below the front upper side member 300 and can be disposed parallel (or generally parallel) to the front upper side member 300, and the front end of the front side member 200 can be mounted on a rear surface of the subframe mounting member 100.

An upper end of the dash side member 400 can be mounted on a rear end of the front upper side member 300, and a lower end of the dash side member 400 can be mounted on a rear end of the front side member 200, such that the dash side member 400, sloping downward at a set, selected, or predetermined angle toward the rear, can be connected between the rear end of the front upper side member 300 and the rear end of the front side member 200.

Accordingly, the subframe mounting member 100 and the dash side member 400 can form front and rear sides of the quadrilateral frame, and the front upper side member 300 and the front side member 200 can form upper and lower sides of the quadrilateral frame, thereby forming the quadrilateral frame.

Furthermore, the front portion 510 and a rear portion 520 of the subframe 500 may be mounted on lower ends of the members forming the quadrilateral frame.

In an embodiment of the present disclosure, the front portion 510 of the subframe 500 can be mounted on the lower end of the subframe mounting member 100, and the rear portion 520 of the subframe 500 can be mounted on a lower end of the front side member 200.

Referring to FIG. 4, the lower end of the subframe mounting member 100 can be positioned lower than the front end of the front side member 200, such that the front portion 510 of the subframe 500 is mounted or attached to the body via the subframe mounting member 100.

The rear end of the front side member 200 can be formed to slope downward toward the rear, such that the rear portion 520 of the subframe 500 is mounted or attached to the body via the front side member 200 and/or the dash side member 400.

Accordingly, the front portion 510 and the rear portion 520 of the subframe 500 can be mounted on the subframe mounting member 100 and the front side member 200 forming a quadrilateral frame, respectively, such that the load of the subframe 500 can be distributed among the members forming the quadrilateral frame, thereby reinforcing the stiffness of the body.

In an embodiment of the present disclosure, the front side member 200 having a shape sloping downward and rearward combined with the subframe 500, and a lower portion of the subframe mounting member 100 (extending between a front end of the front side member 200 and the front portion 510 of the subframe 500), can together form a generally triangular frame or truss structure, for example.

In an embodiment of the present disclosure, the subframe mounting member 100 may be connected to a member forming a frame of a tailgate opening 600. Even though "front" and "rear" are used herein as relative direction descriptors, they can be flipped for a given embodiment (i.e., front can become rear while rear becomes front). Given that some electric vehicle have space at the front of the vehicle where an engine would normally reside for some internal-combustion-engine-powered vehicles, a front of a vehicle can have a "tailgate" opening, even though it can be at the front of the vehicle rather than the rear. Accordingly, the term "tailgate" as used herein can be at any side of a vehicle (e.g., front, rear, or side(s)).

Referring to FIG. 1, a vehicle to which an embodiment of the present disclosure can apply may be a vehicle having one or more tailgates that may be opened from the front and/or the rear.

To configure an opening of the tailgate, members can be connected in a generally rectangular or square shape along an edge line of the tailgate, thereby forming a frame of the tailgate opening 600.

Accordingly, the upper end of the subframe mounting member 100 may be connected to a member forming a lower end of the frame of the tailgate opening 600.

Accordingly, the load of the subframe 500 can be distributed, along the subframe mounting member 100, among the members forming the frame of the tailgate opening 600, thereby reinforcing the stiffness of the body and the mounting stiffness of the subframe 500.

In an embodiment where the subframe mounting member 100 is connected to the tailgate opening 600, the front cross member 610 can be forming the lower end of the frame of the tailgate opening 600 and can be mounted laterally on the subframe mounting member 100, and side outer members 620 can be forming left and right ends of the frame of the tailgate opening 600 and may be mounted vertically on the front cross member 610.

Referring to FIG. 1, the front cross member 610 can be disposed lengthwise in a lateral direction along the lower end of the line of the tailgate opening 600, such that the upper end of the subframe mounting member 100 is mounted or attached to the frame of the tailgate opening 600.

Lower ends of the side outer members 620 can be mounted on left and right ends of the front cross member 610, and the side outer members 620 can be disposed lengthwise upward, thereby forming the left and right ends of the frame of the tailgate opening 600.

A loop cross member 630 can be connected lengthwise in a lateral direction between upper ends of the side outer members 620 on the left and right sides, thereby forming an upper end of the frame of the tailgate opening 600.

Side outer completes 700 can be extending from the tailgate opening 600 to sides of the vehicle and may be mounted laterally on the side outer members 620.

Figure 5:
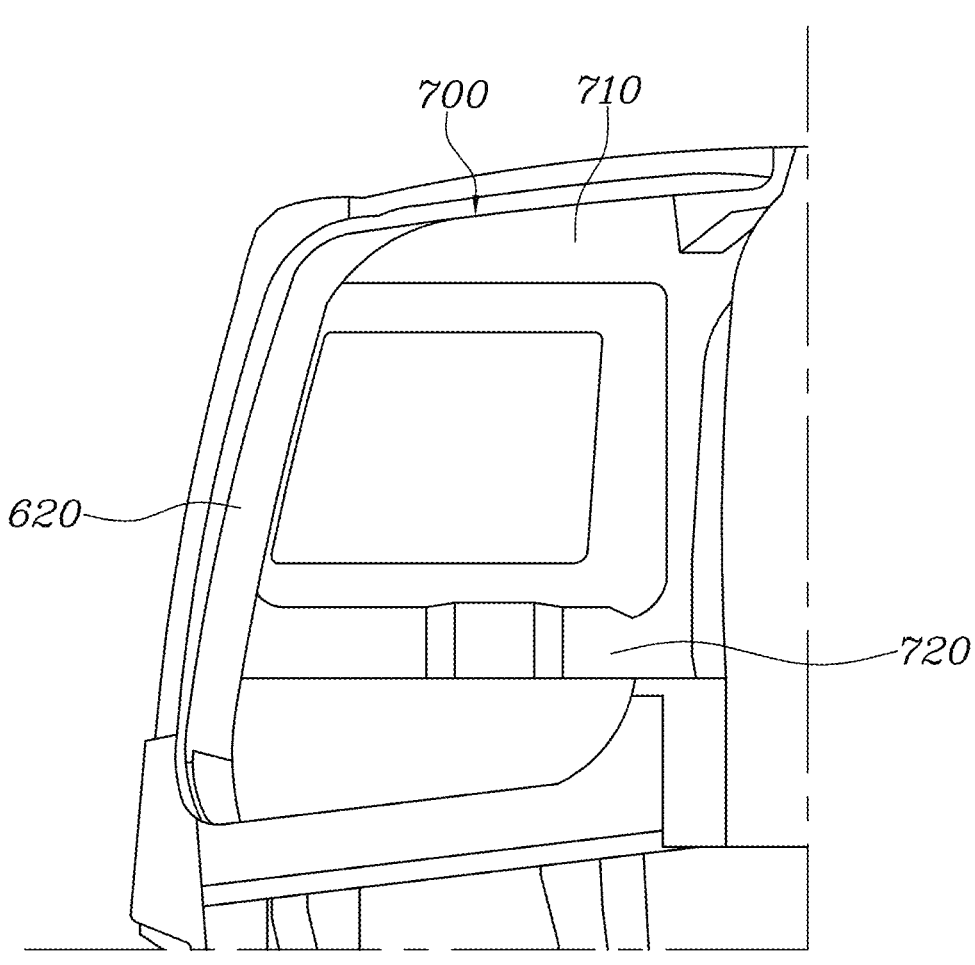
FIG. 5 is a perspective view illustrating a configuration in which a side outer member is connected to a side outer complete according to an embodiment of the present disclosure.

Referring to FIGS. 1 and 5, an upper cross member 710 and a lower cross member 720 of the side outer complete 700 can be mounted to the side outer member 620 (e.g., at a midpoint between upper and lower portions of the side outer member 620), such that the side outer member 620 can be connected to the side outer complete 700.

Accordingly, the subframe mounting member 100 can be also connected to the side outer complete 700 through the members forming the tailgate opening 600, such that the load transmitted from the subframe 500 may be more uniformly distributed through the body.

Figure 6:
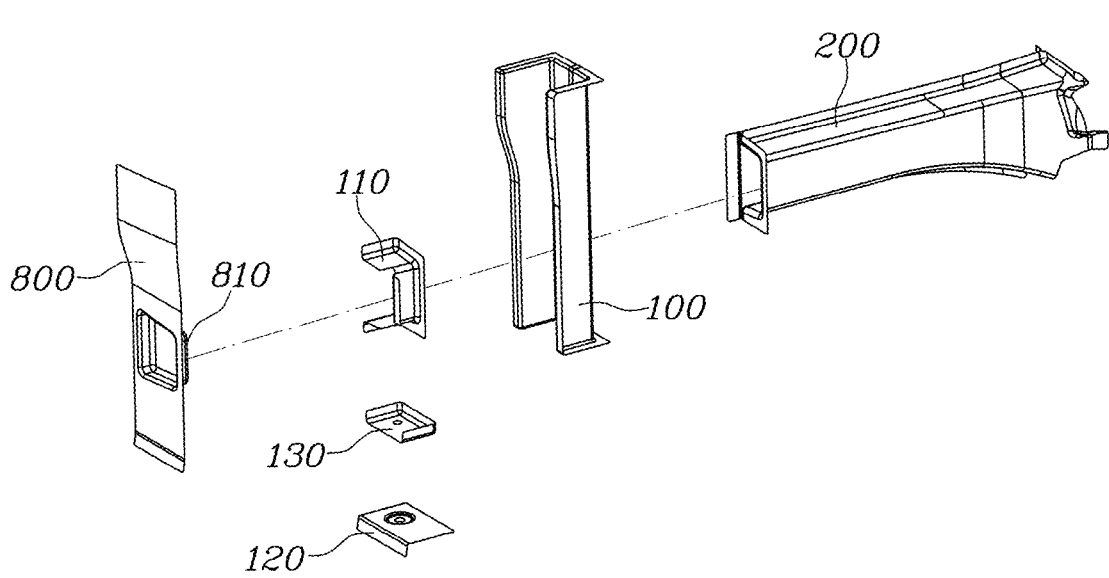
FIG. 6 is an exploded view illustrating components coupled to front and rear surfaces of the subframe mounting member according to an embodiment of the present disclosure.
Figure 7:
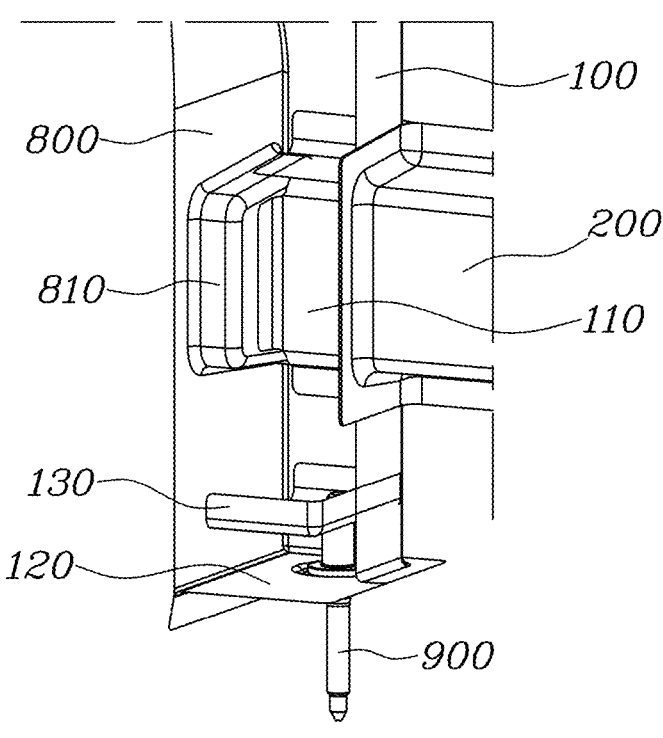
FIG. 7 is a perspective view illustrating a configuration in which a side member extension and a beam plate are connected to the subframe mounting member according to an embodiment of the present disclosure.

Referring to FIGS. 6 and 7, in an embodiment of the present disclosure, a side member extension 110 may be mounted on an inner surface of the subframe mounting member 100, such that the side member extension 110 serves as an extension of the front side member 200.

Referring to FIGS. 6 and 7, a cross-section of the subframe mounting member 100 in a vertical direction may be formed in a 'C'-shape with an open front (or a 'U'-shape when viewed from another angle).

Accordingly, the front end of the front side member 200 can be mounted on the rear surface of the subframe mounting member 100, and the side member extension 110 can be mounted on the inner surface of the subframe mounting member 100 and can be configured to match the rear surface on which the front side member 200 is mounted.

That is, in an embodiment of the present disclosure, because the subframe mounting member 100 can be applied to the front end of the front side member 200, a length of the front side member 200 can be shortened by a longitudinal length of the subframe mounting member 100.

Accordingly, the side member extension 110 can be secured inside the subframe mounting member 100 in a configuration in which the side member extension 110 can serve as an extension of the front side member 200, thereby compensating for the shortened length of the front side member 200, and thus ensuring the stiffness of the front side member 200.

The side member extension 110 may be formed with a cross-sectional shape that matches the front side member 200.

That is, a rear end of the side member extension 110 may be formed with a 'U'-shaped cross-section and an open outer surface, and the front end of the front side member 200 may also be formed with a 'U'-shaped cross-section and an open outer surface.

Accordingly, the rear end of the side member extension 110 and the front end of the front side member 200 can be secured at the same position on the inner and outer surfaces of the subframe mounting member 100, respectively, such that the side member extension 110 stably serves to compensate for the length of the front side member 200.

In an embodiment of the present disclosure, a beam plate 800 may be coupled to cover a front surface of the subframe mounting member 100 to form a closed cross-sectional structure; a forming portion 810 may be formed to protrude from an inner surface, facing the subframe mounting member 100, of the beam plate 800; and the side member extension 110 may be formed to surround a periphery of the forming portion 810 and connected to the inner surface of the beam plate 800.

Referring to FIGS. 6 and 7, the beam plate 800 can be formed in a vertically long plate shape and can be coupled to cover the front surface of the subframe mounting member 100 formed with an opening. Accordingly, the beam plate 800 and the subframe mounting member 100, which can be coupled to each other, can form a rectangular closed cross-sectional structure.

A portion of the inner surface of the beam plate 800 may protrude toward the closed cross-sectional space to form the forming portion 810.

The forming portion 810 may be formed in a hexahedral shape and formed at a position corresponding to the side member extension 110.

In particular, upper surface, lower surface, and one side surface of an outer side of the forming portion 810 can be coupled to be fitted into upper surface, lower surface, and one side surface inside the side member extension 110, respectively, thereby enhancing the coupling stiffness of the subframe mounting member 100 and the beam plate 800.

The beam plate 800 may be coupled to cover the front surface of the subframe mounting member 100; and the beam plate 800 may be mounted, together with the subframe mounting member 100, on the front cross member 610.

Figure 2:
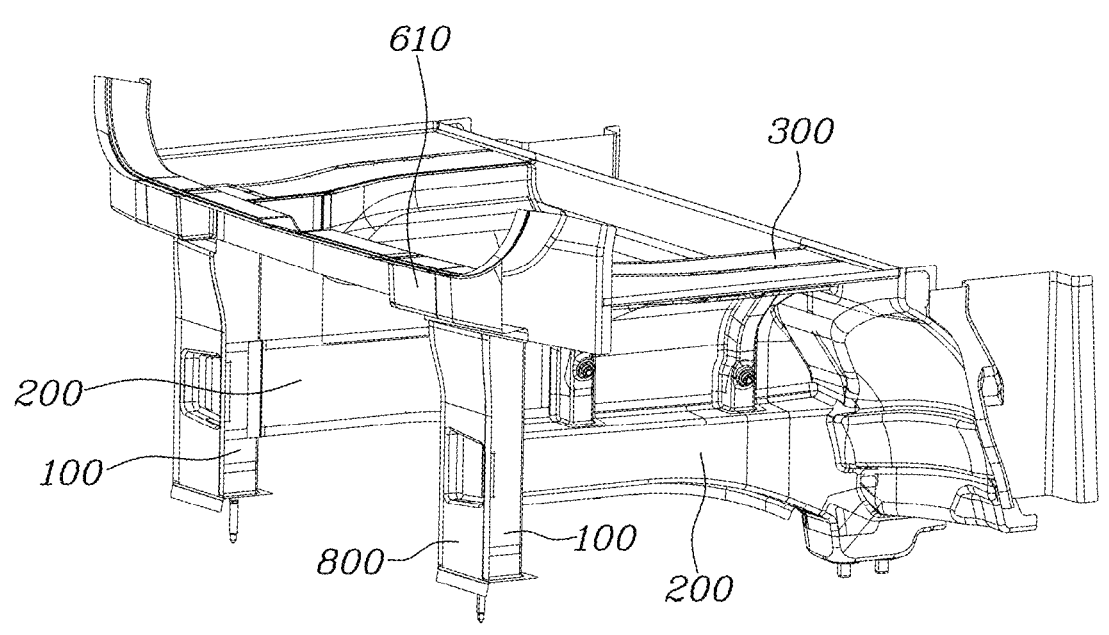
FIG. 2 is a perspective view illustrating a configuration of the body from which the tailgate opening in FIG. 1 is removed.

Referring to FIGS. 2 and 6, the beam plate 800 can be coupled to cover the front surface of the subframe mounting member 100, such that the beam plate 800 is unified with the subframe mounting member 100.

Accordingly, when the subframe mounting member 100 and the front cross member 610 are mounted, a front surface of the beam plate 800 can be connected to the rear surface of the front cross member 610. Accordingly the load transmitted from the subframe mounting member 100 may be effectively transmitted to the front cross member 610.

A mounting bracket 120 may be coupled to the lower end of the subframe mounting member 100 and mounted on the subframe 500; and a mounting reinforcement 130 may be secured to an inner surface, adjacent to the mounting bracket 120, of the subframe mounting member 100, and be mounted, together with the mounting bracket 120, on the subframe 500.

Referring to FIGS. 6 and 7, the mounting bracket 120 can be secured to the lower end of the subframe mounting member 100.

The mounting reinforcement 130 can be secured to the inner surface, adjacent to the mounting bracket 120, of the subframe mounting member 100 in a horizontal direction to reinforce the mounting stiffness.

Accordingly, a mounting element 900 may be provided to pass downward through the mounting reinforcement 130 and the mounting bracket 120, and the mounting element 900 may be secured to the front portion 510 of the subframe 500, such that the mounting bracket 120 may be mounted on the front portion 510 of the subframe 500.

That is, the mounting reinforcement 130, which can be mounted together with the mounting bracket 120 on the subframe 500, may reinforce the mounting stiffness.

Although certain example embodiments of the present disclosure have been illustrated and described, it can be apparent to those skilled in the art that various modifications and changes to the disclosed embodiments may be made without departing from the technical spirit of the present disclosure provided in the following claims, and equivalents thereof.

What is claimed is:

1. A vehicle body comprising:
   a subframe mounting member disposed vertically and having a subframe-mounting-member lower end mounted on an end of a subframe;
   a front side member mounted on a rear of the subframe mounting member;
   a side member extension mounted on a subframe-mounting-member inner surface of the subframe mounting member, such that the side member extension is an extension of the front side member;
   a beam plate coupled to cover a front surface of the subframe mounting member to form a closed cross-sectional structure; and
   a forming portion protruding from a beam-plate inner surface of the beam plate and facing the subframe mounting member, wherein the side member extension surrounds a periphery of the forming portion and is connected to the beam-plate inner surface of the beam plate.

2. The vehicle body of claim 1, further comprising:
   a front cross member; and
   a front upper side member, wherein the front cross member and the front upper side member are mounted, in different directions relative to each other, on the subframe mounting member.

3. The vehicle body of claim 2, wherein the subframe mounting member, the front cross member, and the front upper side member are mounted in directions perpendicular to one another.

4. The vehicle body of claim 2, wherein the front cross member is mounted laterally at a front of the subframe mounting member; and wherein the front upper side member is mounted longitudinally at the rear of the subframe mounting member.

5. The vehicle body of claim 2, wherein the front cross member and the front upper side member are mounted on the subframe mounting member at a height at which the front cross member and the front upper side member face each other.

6. The vehicle body of claim 2, wherein the beam plate is mounted, together with the subframe mounting member, on the front cross member.

7. The vehicle body of claim 1, further comprising:

a front upper side member; and a dash side member, wherein the front upper side member and the dash side member are connected to the subframe mounting member and the front side member to form a quadrilateral frame.

8. The vehicle body of claim 7, wherein front and rear portions of the subframe are mounted on lower ends of a structure configured to form the quadrilateral frame.

9. The vehicle body of claim 1, further comprising:

a front upper side member mounted longitudinally on an upper portion of the subframe mounting member, wherein the front side member is mounted longitudinally on the subframe mounting member below the front upper side member; and a dash side member mounted vertically between the front side member and the front upper side member, such that the subframe mounting member, the front upper side member, the dash side member, and the front side member form a quadrilateral frame.

10. The vehicle body of claim 1, further comprising a tailgate-opening-frame member, wherein the subframe mounting member is connected to the tailgate-opening-frame member, and wherein the tailgate-opening-frame member is configured to be part of a tailgate-opening frame of a tailgate opening.

11. The vehicle body of claim 1, further comprising:

a front cross member mounted laterally on the subframe mounting member, wherein the front cross member is configured to form a tailgate-opening-frame lower end of a tailgate-opening frame of a tailgate opening; and side outer members mounted vertically on the front cross member, wherein the side outer members are configured to form left and right ends of the tailgate-opening frame of the tailgate opening.

12. The vehicle body of claim 1, wherein the side member extension has a side-member-extension cross-sectional shape that matches a front-side-member cross-section shape of the front side member.

13. The vehicle body of claim 1, further comprising:

a mounting bracket coupled to the subframe-mounting-member lower end of the subframe mounting member and mounted on the subframe; and a mounting reinforcement secured to the subframe-mounting-member inner surface, adjacent to the mounting bracket, of the subframe mounting member, wherein the mounting reinforcement is mounted, together with the mounting bracket, on the subframe.

14. A vehicle comprising:

a subframe having a subframe front portion and a subframe rear portion, wherein the subframe is at least partially on a first side of the vehicle and extending in a longitudinal direction of the vehicle between the subframe front portion and the subframe rear portion of the subframe; and a vehicle body including a first quadrilateral frame coupled to the subframe front portion and the subframe rear portion of the subframe, wherein the first quadrilateral frame is above the subframe, wherein the first quadrilateral frame is on the first side of the vehicle and extending in the longitudinal direction of the vehicle, and wherein the first quadrilateral frame comprises:

a subframe mounting member extending vertically and having a subframe-mounting-member lower end mounted on an end of the subframe at the subframe front portion, a front side member coupled to the subframe mounting member and extending in the longitudinal direction of the vehicle, wherein the front side member includes a rear-lower portion mounted on the subframe rear portion of the subframe, a side member extension mounted on a subframe-mounting-member inner surface of the subframe mounting member, such that the side member extension is an extension of the front side member, a beam plate coupled to cover a front surface of the subframe mounting member to form a closed cross-sectional structure, and a forming portion protruding from a beam-plate inner surface of the beam plate and facing the subframe mounting member, wherein the side member extension surrounds a periphery of the forming portion and is connected to the beam-plate inner surface of the beam plate.

15. The vehicle of claim 14, wherein the first quadrilateral frame further comprises:

a front upper side member coupled to the subframe mounting member and extending in the longitudinal direction of the vehicle above the front side member; and a dash side member coupled to a front-upper-side-member rear end of the front upper side member, wherein the dash side member is coupled to the rear-lower portion of the front side member.

16. The vehicle of claim 14, wherein the front side member is coupled to the subframe mounting member at a first mounting location at a first spaced distance above the subframe, such that a subframe-mounting-member lower portion of the subframe mounting member at the first spaced distance, the front side member, and the subframe, together, form a triangular frame structure.

17. The vehicle of claim 16, wherein the vehicle body further comprises a front cross member coupled to the subframe mounting member, wherein the front cross member extends in a lateral direction of the vehicle;

wherein the first quadrilateral frame further comprises:

a front upper side member coupled to the subframe mounting member and extending in the longitudinal direction of the vehicle above the front side member, and a dash side member coupled to a front-upper-side-member rear end of the front upper side member, wherein the dash side member is coupled to the rear-lower portion of the front side member;

wherein the subframe is at a first level;

wherein the first mounting location on the subframe mounting member is at a second level, wherein a front end of the front side member is at the second level, wherein the second level is above the first level separated by the first spaced distance; and wherein the front cross member and the front upper side member are at a third level, wherein the third level is above the second level separated by a second spaced distance.

18. A vehicle comprising:

a subframe having a subframe front portion and a subframe rear portion, wherein the subframe extending in a longitudinal direction of the vehicle between the subframe front portion and the subframe rear portion of the subframe, wherein the subframe is at a first level; and a vehicle body mounted on the subframe, wherein the vehicle body comprises:

a subframe mounting member extending vertically and having a subframe-mounting-member lower end mounted on an end of the subframe at the subframe front portion, a front side member having a front-side-member front end coupled to the subframe mounting member at a first mounting location at a spaced distance above the subframe, such that the subframe mounting member has a subframe-mounting-member lower portion of the subframe mounting member extending between the subframe and the first mounting location, wherein the front side member includes a rear-lower portion mounted on the subframe rear portion of the subframe, wherein the front side member extends in the longitudinal direction of the vehicle and generally diagonally rearward from the first mounting location, such that the rear-lower portion of the front side member is mounted on the subframe rear portion of the subframe at the first level, wherein the first mounting location on the subframe mounting member is at a second level, wherein the front-side-member front end of the front side member is at the second level, wherein the second level is above the first level by the spaced distance, and such that the subframe-mounting-member lower portion of the subframe mounting member, the front side member, and the subframe, together, form a triangular frame structure, a side member extension mounted on a subframe-mounting-member inner surface of the subframe mounting member, such that the side member extension is an extension of the front side member, a beam plate coupled to cover a front surface of the subframe mounting member to form a closed cross-sectional structure, and a forming portion protruding from a beam-plate inner surface of the beam plate and facing the subframe mounting member, wherein the side member extension surrounds a periphery of the forming portion and is connected to the beam-plate inner surface of the beam plate.

19. The vehicle of claim 18, further comprising a tailgate-opening-frame member, wherein the subframe mounting member is connected to the tailgate-opening-frame member, and wherein the tailgate-opening-frame member is configured to be part of a tailgate-opening frame of a tailgate opening.

20. The vehicle of claim 18, further comprising:

a front cross member mounted laterally on the subframe mounting member, wherein the front cross member is configured to form a tailgate-opening-frame lower end of a tailgate-opening frame of a tailgate opening; and side outer members mounted vertically on the front cross member, wherein the side outer members are configured to form left and right ends of the tailgate-opening frame of the tailgate opening.

* * * * *